H. GROB.
AUTOMATIC SWITCH.
APPLICATION FILED DEC. 28, 1908.
1,163,996.
Patented Dec. 14, 1915.
2 SHEETS—SHEET 2.
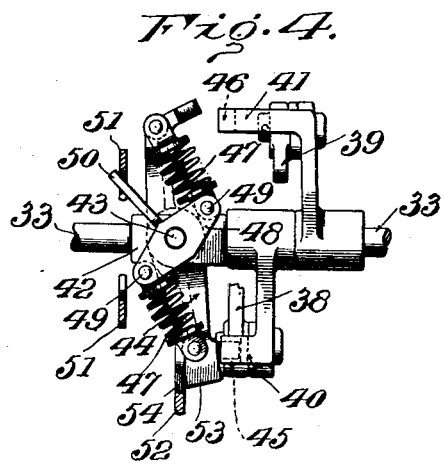
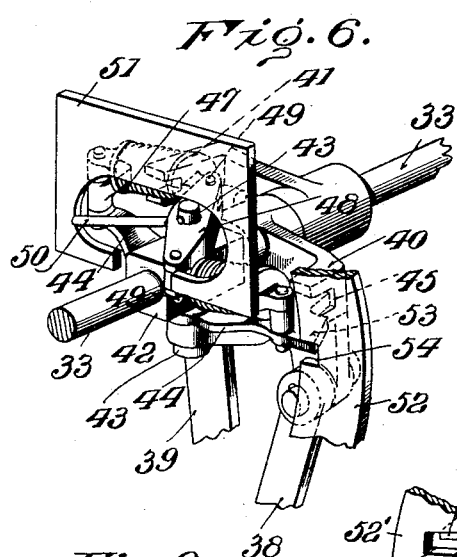
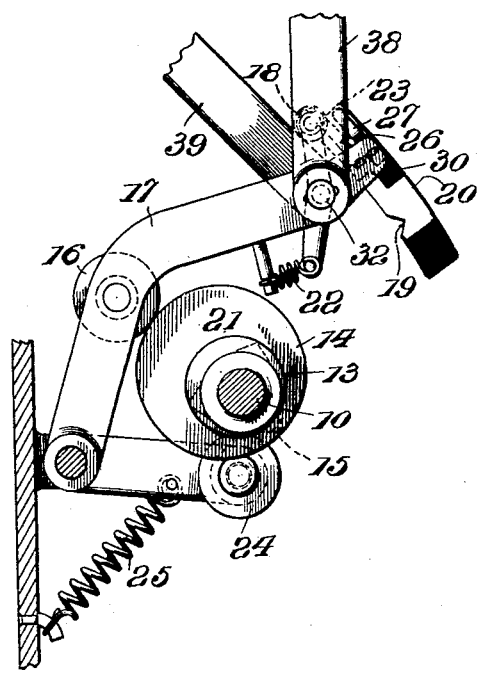
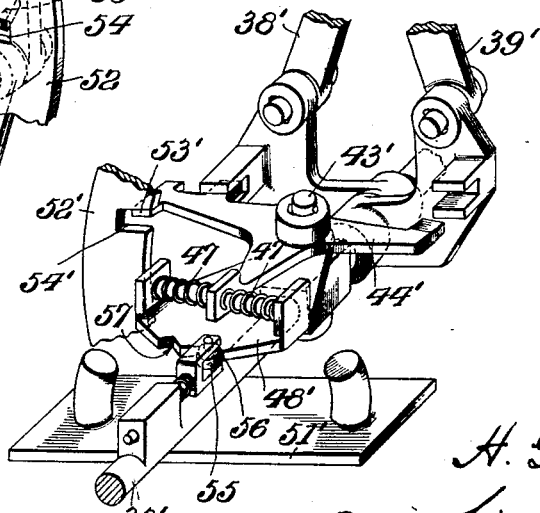
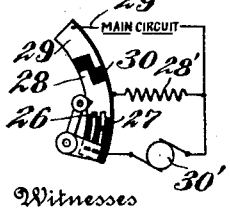
Inventor
H. Grob.
By Duell, Warfield & Duell
Attorneys
Witnesses
W. A. Williams
R. E. Klein

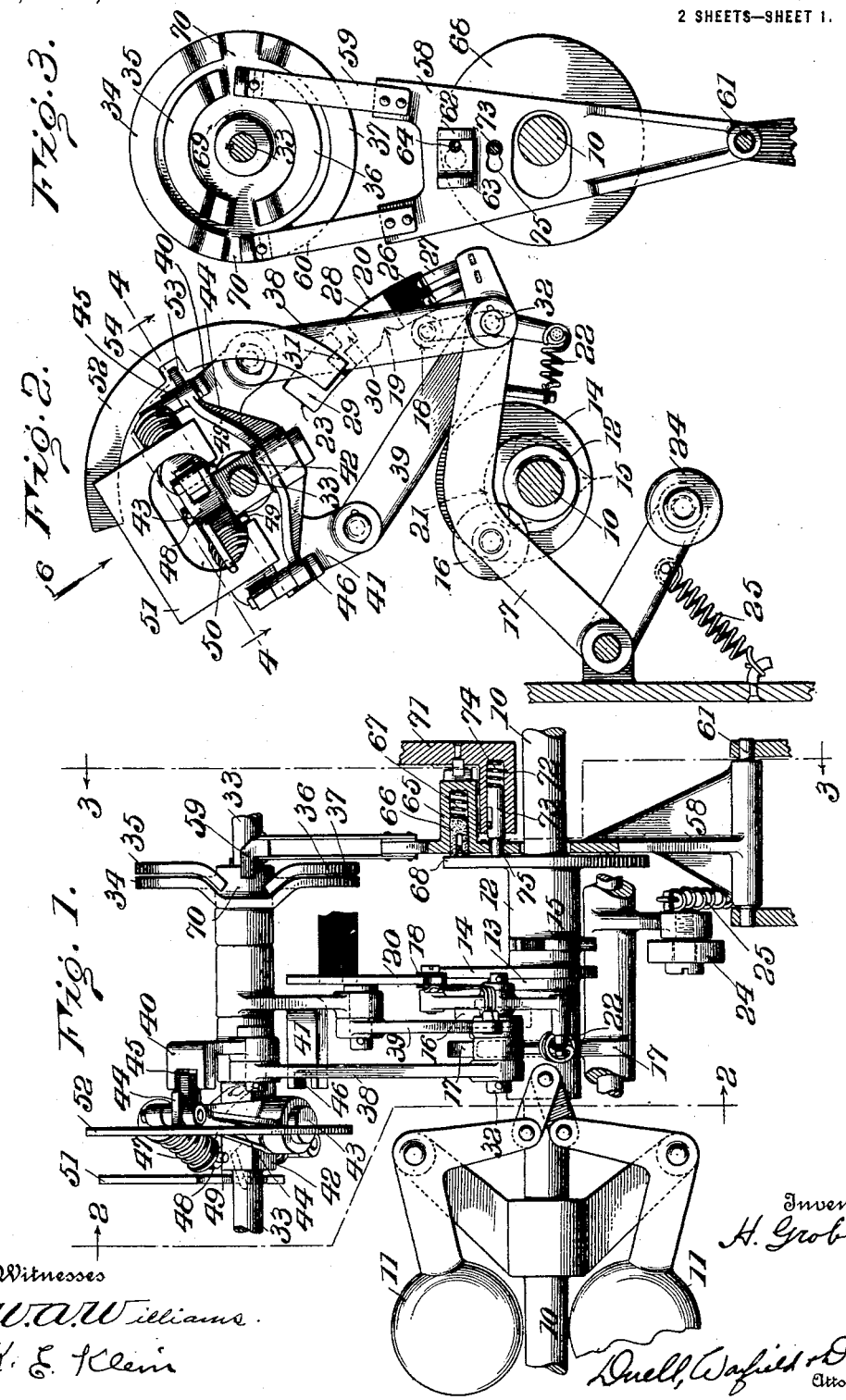

UNITED STATES PATENT OFFICE.

HUGO GROB, OF ZURICH, SWITZERLAND, ASSIGNOR TO SAFETY CAR HEATING & LIGHTING COMPANY, A CORPORATION OF NEW JERSEY.

AUTOMATIC SWITCH.

1,163,996.  Specification of Letters Patent.  Patented Dec. 14, 1915.

Application filed December 28, 1908. Serial No. 469,694.

*To all whom it may concern:*

Be it known that I, HUGO GROB, a citizen of the Swiss Confederation, residing at Zurich, Switzerland, have invented certain new and useful Improvements in Automatic Switches, of which the following is a specification.

The present invention relates to electric switching apparatus, and, with regard to certain more specific features, to a controlling or switch mechanism for an electric train-lighting system embodying an axle-driven generator, and has especial reference to apparatus of a character described in my United States Patent, No. 994,510, though it will be obvious that certain features of the invention are applicable to various types of electrical devices.

In the patent above noted the following operations of the controlling mechanism are performed: First, the disconnection of the generator from the external circuit whenever the train is traveling below a critical speed. Second, the interchange, at suitable intervals, of the connections to the two batteries, one of which is utilized in the exciting circuit of the dynamo while the other receives charging current. Third, compensation for the reversal of the polarity of the generator, after the direction of travel of the train has been reversed.

One of the objects of the present invention is to provide reliable and efficient mechanism for connecting the generator with the external circuit whenever the generator is rotating at a sufficient speed to enable it to develop the required voltage, and to disconnect the generator from this circuit when the speed of the generator and the train is below this critical value.

Another object is to provide apparatus of the above type for exchanging the electrical connections to the batteries of a double-battery train-lighting system such for instance as the system illustrated in my Patent 994,510, above noted.

Another object is to provide a pole-changer that will be at once dependable in action and free from appreciable wear on any of the parts.

Another object is to provide a mechanically operated switching device for closing, prior to the connection of the generator with the external circuit, an intermediate circuit containing a dead resistance, to reduce or prevent any fluctuation of the voltage in the main circuit when the main circuit connections are completed.

Another object is to provide in a single mechanism an efficient and durable main switch, battery - interchanging switch and the pole-changer actuated by means purely mechanical and thus free from the complication and expense attendant upon the installation and maintenance of many electrically operated devices for accomplishing these purposes.

Other objects will be in part obvious and in part pointed out hereinafter.

The invention accordingly consists in the features of construction, combinations of elements, and arrangements of parts which will be exemplified in the construction hereinafter set forth. and the scope of the application of which will be indicated in the following claims.

In the drawings, in which are illustrated one or more of various possible embodiments of the several features of this invention, Figure 1 illustrates a front elevation of a preferred type of switching apparatus. Fig. 2 is a sectional elevation on the line 2—2 of Fig. 1 looking toward the right. Fig. 3 is a sectional elevation on the line 3—3. of Fig. 1, looking toward the left, illustrating more particularly certain electrical portions of the mechanism. Fig. 4 is a section on the line 4—4, Fig. 2, showing the two-way clutch with its associated parts. Fig. 5 is a view corresponding to Fig. 2, illustrating the parts in the running position. Fig. 6 illustrates in perspective view portions of the apparatus of Figs. 1, 2, 4, and 5, viewed in the direction of the arrow 6, Fig. 2. Fig. 7 is an inverted perspective modified form of switch-shaft-oscillating mechanism. Fig. 8 is a diagrammatic representation of certain portions of the mechanism with the circuits connected thereto.

Similar reference characters refer to similar parts throughout the several views of the drawings.

The entire apparatus is set in operation by a centrifugal governor. This governor is mounted upon a slowly running axle-driven main shaft 10 and as the speed of the main shaft varies, the governor balls 11 move radially inward or outward, as the case may be, thereby shifting axially the sleeve 12, together with the two lifting eccentrics 13, 14 and the return cam 15. As the sliding sleeve 12 is moved toward the left from its position corresponding to train rest, in Fig. 1, the first lifting eccentric 13 is brought into the path of the lifting roller 16, on the bell-crank main lever 17, the rotation of the main shaft 10 causing the main lever 17 to rise until the spring-pressed pawl-roller 18 carried thereby rests in the notch 19 of the fixed plate 20. As the main shaft 10 continues to rotate, carrying the high point 21 of the first eccentric 13 away from the roller 16, the main lever 17 is held in this intermediate position by the spring 22 acting on the pawl-roller 18 in the notch 19. As the critical speed of the governor is reached the main sleeve 12 continues its motion toward the left (Fig. 1) and the second eccentric 14 comes now into the path of the roller 16 of the main lever 17, and lifts the latter further, until the pawl-roller 18 reaches the position indicated in Fig. 5, where the main lever 17 is held by the pawl-roller 18 and the fixed plate 20, the roller resting upon the upper edge 23 of the fixed plate 20 and being pressed clockwise against said surface by the spring 22. Thus the main lever 17 is held in its upper or running position despite the continued rotation of the second eccentric 14.

The apparatus might be so arranged that when the governor weights 11 close, due to the reduction of train speed below the critical value, the eccentrics 13, 14 employed for lifting the apparatus into its running position might serve to return the elements into the lower position corresponding to train rest. There is the danger, however, that if the train wheels are locked as by the application of the emergency brake the main shaft 10 would travel less than the necessary angular distance to effect the return movement of the main lever 17 before said shaft and said generator come to rest. According to the present invention it is not necessary for the lifting eccentrics 13, 14, to effect the switching out by pressing down the main lever 17 throughout its entire angular stroke since it is simply necessary to depress the return roller 24 slightly, enough to release the holding pawl 18, after which the rest of the return, open-circuiting movement of the main lever 17 is effected by gravity, aided by the spring 25. Furthermore, in order to accelerate the action of the returning mechanism to provide for such emergencies as the locking of the wheel, the return device comprises, instead of an eccentric, a cam 15 with a number of projections, any one of which thrusts the return roller 24 on the main lever 17, just so far downward that the pawl-roller 18 is thereby drawn down over the upper edge 23 of the fixed plate 20 and the main lever thus drops. The reduction of train speed to a point below the critical value causes the main sleeve 12 to be shifted to the right (Fig. 1) bringing the lifting eccentrics 13 and 14 both out of operative relation with the lifting roller 16 and bringing into the same vertical plane the return cam 15 and the return roller 24. By providing a plurality of projections on the return cam 15 the return roller 24 has the opportunity several times during each revolution of the main shaft 10 of slipping in between two of the projections and of being pushed downward with a slight subsequent angular movement of the main shaft 10 so that for instance if three projections are provided only about one-third of a revolution of the main shaft 10, after the generator speed falls below the crictical value, is needed to effect the complete return movement of the main lever 17 and the switching out of the generator.

Owing to the fact that the generator voltage does not build up instantaneously, the sudden variation liable to occur in the lamp voltage when the generator is switched onto the main circuit may be reduced or prevented by bringing the field excitation up to its full load value before the connection with the external circuit is made and then, after the excitation has had time to attain its full strength, to connect the generator with the external circuit. As the generator comes up to its critical speed it is excited but ordinarily is not yet loaded. Then, when the connection with the external circuit is made the excitation is not sufficient for the full load of the generator and in consequence of this fact there may be a momentary diminution of the lamp voltage until the excitation has increased to compensate for the voltage drop in the armature. According to the present invention this disadvantage is overcome by loading the dynamo prior to the closing of the external circuit connection, with an auxiliary resistance and disconnecting said resistance after the connection with the external circuit has been completed. To this end, the notch 19 in fixed plate, above referred to, is provided to insure an appreciable pause in the circuit-closing movement of the main lever 17, the connections hereinafter described being provided so that during this intermediate position with the pawl 18 in the notch 19 the generator will be connected with the auxiliary load.

In the transition from the auxiliary load to the working load, effected during the second portion of the lifting-movement of the main lever 17 a parallel connection of short duration is provided between the auxiliary and the working circuits. The brush, which is to conduct the current from the generator first to the auxiliary resistance and then to the main circuit, should be in contact with the latter before contact with the former is broken in order that the generator may not be relieved of its load. In order that a wide brush or an excessive motion of the brush may not be necessary, provision is made for avoiding the danger due to arcing across the small insulating gap between the contacts leading respectively to the auxiliary resistance and the main circuit. This device is illustrated in Figs. 1, 2, and 5, wherein the two brushes 26 and 27 connected in parallel are mounted on the main lever 17 so as to travel over the contacting portions 28, 29 on the fixed plate 20, the portion 28 leading to the auxiliary resistance and the portion 29 to the main circuit. The opposite boundary edges 30 and 31 of the two contacting portions 28, 29 are so formed that each brush has to traverse along the separating insulation piece, thereby avoiding the danger due to arcing, without necessitating the use of a brush, longer, in the direction of its travel, than the insulating segment. For by this shouldering or staggering of the boundaries of the contacting portions 28, 29 the brush 27 makes contact with the portion 29 leading to the external circuit before the other brush 26 has broken the connection to the auxiliary resistance, it being understood that one of the mains leading to the generator is in electrical connection with both brushes 26 and 27. The above described arrangement is diagrammatically indicated in Fig. 8, in which 28' represents the auxiliary resistance and 29' the main circuit, while 30' is the generator, to one terminal of which both brushes 26 and 27 are connected.

As stated above, the opening and closing of the governor weights 11 with variations in train speed effects, through the lifting eccentrics 13 and 14 and the return cam 15, an oscillation of the main lever 17. Reference to Figs. 2 and 5 will make it clear that this results in an approximately rectilinear movement, up and down, of the upper end 32 of this main lever 17. Through mechanism now to be described, this movement is converted into an oscillating motion of the shaft 33 carrying the contacts of the switching mechanism.

The details of the switch-shaft-oscillating mechanism will first be explained with reference to the preferred embodiment of the invention illustrated in Figs. 1 to 6 and especially in Fig. 6.

The switch shaft upon which the annular contact segments 34, 35, 36, 37 are mounted, is illustrated at 33. Two links, 38 and 39, are connected with the main lever 17 which is rotated counter-clockwise (Figs. 2 and 5) when the train speed rises to the critical value, pushing the links 38 and 39 upward. The two clutch members 40 and 41 connected respectively to the upper ends of the two levers 38 and 39 are both sleeved on the switch shaft 33 and turn in opposite directions about the switch shaft 33 as an axis. The latter has the squared portion 42 in which is secured the stud 43 extending upward to the left (Fig. 2) when the switch shaft 33 is in mid-position illustrated in Fig. 2. Mounted upon this stud 43 and capable of pivoting about it is a two-way clutch 44, which in its two end positions engages either in the fork-shaped projection 45 of the clutch member 40 or in the projection 46 of the clutch member 41 and thus couples the clutch member 40 or 41, as the case may be, fast to the switch shaft 33. The angular position of the two-way clutch 44 with respect to the stud 43 is changed through the medium of the springs 47 which are attached at their outer ends to pins on the two-way clutch 44 and at their inner ends to a spring-carrier 48, which, like the two-way clutch 44, is mounted upon the stud 43 for pivotal movement with respect to said stud. The spring carrier 48 is limited in its angular travel about the stud 44, by the spring-holding pins 49 striking against the squared faces 42 of the switch shaft 33.

Assuming now that the train speed rises to the critical value and the lifting eccentrics 13, 14 push the links 38, 39 upward, then if the two-way clutch 44 be in engagement with the clutch member 40, as illustrated in Figs. 1, 2, 4, and 6, the other clutch member 41, which is not coupled to the switch shaft, will simply turn loosely about said shaft clockwise (Fig. 2), while the switch shaft 33 itself will be turned counter clockwise (Fig. 2) through the medium of the link 38, clutch member 40, two-way clutch 44, and stud 43. In the course of this rotation the projection 50 on the spring-carrier 48 oscillating as a whole about the axis of the switch shaft 33, strikes against the fixed plate 51, and by this means the projection 50 causes the spring carrier 48 to rotate about the stud 43 in a clockwise direction (Fig. 4) past the dead-center point where the two springs 47 are coaxial, after which the spring carrier 48 snaps around into its other end position, indicated in Fig. 4, which is determined by the striking of the pins 49 on the spring carrier 48 against the squared faces 42 of the switch shaft 33. There is a tendency now for the springs 47 to swing the two-way clutch 44 clockwise (Fig. 4) about the stud 43 as an axis, into its other end-position of engagement with the clutch member 41. The two-way clutch cannot, however, follow this impulse to swing, because its rotation about the stud 43 is prevented by the fixed plate 52 engaging a lug 53 on the two-way clutch 44. Only when the centrifugal governor is in the position corresponding to train rest (Figs, 1 and 2), when the main lever 17 and links 38, 39 are lowered and the switch shaft 33, with its stud 43 and associated parts, has been returned to mid-position (Fig. 2) is it possible for the two-way clutch 44 to be rotated about the stud 43 by the springs 47, because it is only at this mid-position of the shaft 33 that the lug 53 on the two-way clutch 44 registers with a slot 54 in the fixed plate 52; in this mid-position the springs 47 are enabled to swing the two-way clutch 44 about the bolt 43 and the clutch is then in engagement with the other clutch member 41. Now as soon as the links 38, 39 are pushed upward the second time by the increase of train speed up to the critical value, the switch shaft 33 turns counter-clockwise instead of clockwise (Fig. 2) because of the change of position of the two-way clutch 44, and the battery connections are interchanged as indicated in Fig. 3. The counter-clockwise rotation (Fig. 2) of the switch shaft 33 now causes the projection 50 on the spring carrier 48 to strike against the other inner surface of the fixed plate 51 and the spring carrier is thereby caused to rotate counter-clockwise (Fig. 4) about the bolt 43 into its other end-position in order, at the next stoppage of the train to again press by means of its springs 47 the two-way clutch 44 into the notch 45 of the clutch member 40; and a similar reversal of the direction of rotation of the switch shaft 33 from mid-position is effected each time that the train speed increases from zero to the critical value. That is, the switch shaft 33 is rotated one time clockwise and the next time counter-clockwise from its mid-position, and this alternating direction of rotation effects the interchange of the batteries above mentioned.

A modification of the switch-shaft-oscillating mechanism embodied in Figs. 1, 2, 4, 5, and 6, is illustrated in perspective in Fig. 7. In this apparatus the springs 47' are at all times approximately coaxial, and in this embodiment of the invention the oscillation of the switch shaft 33' and with it the associated mechanism including the spring carrier 48' brings the spring carrier 48' against the fixed stop 51', this stop being so shaped as to effect the angular movement of the spring carrier 48' about the bolt 43', from the position in which it has been held by the spring-pressed roller 55 acting on the notch 56 into the other end of its angular travel about the bolt 43', in which angular position it is held by the spring-pressed roller 55 engaging the other notch 57 until the rotation of the switch shaft 33' in the other direction from its mid-position brings the spring-carrier 48' against the other portion of the fixed stop 51', whereupon the angular position of the spring carrier 48' about the stud 43' is again reversed. As before, the angular shifting of the spring-carrier places a strain upon the springs, which tends at once to reverse the position of the two-way clutch 44', which reversal, however, is delayed until the switch shaft returns to mid-position, by means of the fixed plate 52' recessed at 54' to allow the reversal of the two-way clutch only at the mid-position of the switch shaft.

When changing the direction of travel the poles of the generator or those of the exciting winding must be exchanged. The pole-changing apparatus hereinafter described is distinguished by the way in which the movement of the contact brushes is effected, and the rapid wearing out of the several parts avoided and also by the means employed for locking the brush-carrying lever in its end positions.

The lever 58 (Figs. 1 and 3) which is made of as light a metal as possible, carries at the top the current-reversing brushes 59 and 60 of the circuit in question, and is oscillated about the pivot 61 through an angular distance limited by the two stops 62, 63 coöperating with the fixed bolt 64. In the brush holder 58 is placed a socket piece 65 (Fig. 1) in which a stud 66 of carbon or other suitable material, is forced toward the left (Fig. 1) by a spring 67. One end of the shifting sleeve 12 attached to the centrifugal governor mechanism carries a disk 68 which, when the governor weights 11 are closed (as in Fig. 1), forces the stud 66 into the socket piece 65. As a result of the friction between the stud 66 and the disk 68 the brush-holder 58, which turns about the pivot 61 will be carried along according to the direction of train travel into one or the other of the two end positions determined by the stops 62, 63, and in which the proper polarity of the dynamo terminals is insured through the coöperation of the brushes 59, 60 with the annular contacts 33, 34, 35, 36, upon the flat disk 69, after the latter has turned with the switch shaft 33 from the mid-position illustrated in Fig. 3. When the train is at a stand-still the switch shaft 33, together with the disk 69, is in the mid-position illustrated in Fig. 3, in which the brushes 59, 60 stand opposite a depression 70 in the disk 69, and in consequence thereof are freely movable about the pivot 61 as an axis, in case the train moves thereafter in the opposite direction.

For the purpose of locking the brush holder 58 in both its end positions, there is provided in a fixed member 71 a boring 72 in which a pin 73 is pressed toward the left (Fig. 1) by the pressure of the spring 74. The reduced left hand end (Fig. 1) of this pin projects through a slot 75 in the brush holder 58 and like the stud 66 is forced toward the right (Fig. 1) by the sleeve-carried disk 68 when the train is at rest or moving slowly. The slot 75 in the brush holder 58 comprises preferably two adjacent circles in cross-section, which communicate with each other by a narrow opening. This opening is just wide enough to admit the reduced end of the pin 73, but is not wide enough to let the larger portion pass. The diameters of the two circular portions are, however, sufficient to admit the thicker part of the pin 73. As long as the train is at rest, the sliding sleeve 12 and disk 68 are at the right as indicated in Fig. 1, and only the reduced end of the pin 73 enters the slot 75 of the brush holder 58 and the brush holder is consequently capable of moving freely in either direction through the frictional engagement of the disk 68 with the stud 66. If now the train starts in either direction the slowly rotating main shaft 10 upon which the governor is mounted rotates in a corresponding direction and through the frictional engagement between the stud 66 and the sleeve-carried disk 68 the brush holder 58 is either held in its present end position or is carried into the opposite end position according to the direction of travel of the train. When the critical speed is reached the disk 68 moves toward the left, away from the stud 66 and pin 73 and before it has moved out of engagement with the stud 66 the thicker part of the pin 73 has passed into the adjacent circular portion of the slot 75 and the brush holder 58 is thus locked against any lateral movement. It is obvious that in this arrangement the wear of both the stud 66 and the pin 73 will be unusually small because at ordinary train speeds the sleeve-carried disk 68 is entirely out of contact with either the stud or the pin.

It will thus be seen that there is provided mechanism embodying the features of construction and structural advantages above recited and that the objects of the invention are attained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having thus described my invention, what I claim as new and desire to secure by Letters Patent, is—

1. Apparatus of the character described comprising, in combination a pivoted brush holder, a plurality of sets of annular contacting segments, contacts mounted for oscillation from a mid-position, means for oscillating said segments selectively in either direction from mid-position, whereby the brushes on said pivoted brush holder may be caused to engage selectively with different sets of annular contacting segments.

2. Apparatus of the character described comprising, in combination a pivoted brush holder, a plurality of sets of annular contacting segments, contacts mounted for oscillation from a mid-position, means for oscillating said segments selectively in either direction from mid-position, whereby the brushes on said pivoted brush holder may be caused to engage selectively with different sets of annular contacting segments, the brushes being disconnected from said segments when the latter are in mid-position.

3. Apparatus of the character described comprising, in combination, a plurality of sets of annular contacting segments mounted for oscillation from a mid-position, contacts relatively insulated and bearing simultaneously on a plurality of segments, means for oscillating said segments selectively in either direction from mid-position, whereby said contacts may be caused to engage selectively with different sets of said segments.

4. Apparatus of the character described comprising in combination, a plurality of sets of annular contacting segments mounted for oscillation from a mid-position, contacts relatively insulated and bearing simultaneously on a plurality of segments, means for oscillating said segments selectively in either direction from mid-position, whereby said contacts may be caused to engage selectively with different sets of said segments, said contacts being disconnected from said segments when the latter are in mid-position.

5. Apparatus of the character described comprising in combination, a pivoted brush holder, a plurality of sets of annular contacting segments, contacts mounted for oscillation from a mid-position, means for oscillating said segments selectively in either direction from mid-position, whereby the brushes on said pivoted brush holder may be caused to engage selectively with different sets of annular contacting segments, and means for effecting a predetermined angular displacement of said brush holder.

6. Apparatus of the character described comprising in combination, a pivoted brush holder, a plurality of sets of annular contacting segments mounted for oscillation from a neutral position, means for oscillating said contacts, the brushes being disconnected from said segments when the latter are in neutral position, means for effecting a predetermined angular displacement of said brush holder, whereby the brushes on said holder may be caused to contact selectively with different sets of segments according to the position of said brush holder.

7. Apparatus of the character described comprising in combination, a switch provided with a pivoted contact-carrier, a pivoted member, contacts upon said member adapted to engage those on said carrier, whereby the pivotal displacement of said carrier effects a change of circuit connections, and means for oscillating said carrier about its pivot in one direction or the other according to the direction of rotation of a shaft.

8. Apparatus of the character described comprising in combination, an axle - driven geneartor, means for connecting said generator to an auxiliary resistance as the generator speed approaches a predetermined value, means for connecting said generator to an external circuit and thereafter breaking the connection to said resistance as said generator attains said predetermined value, and means for disconnecting the generator from both circuits when the train speed is below a lower value.

9. Apparatus of the character described comprising in combination, means for oscillating a shaft in either direction from a mid-position, said means comprising clutch members sleeved to said shaft, means for oscillating said clutch members simultaneously in opposite directions, and means for rotating said shaft selectively with one or the other of said clutch members.

10. Apparatus of the character described comprising in combination means for oscillating a shaft in either direction from a mid-position, said means comprising clutch members sleeved to said shaft, means for oscillating said clutch members simultaneously in opposite directions, means for rotating said shaft selectively with one or the other of said clutch members, and an electrical switching device comprising contacts adapted to oscillate with said shaft, whereby one or another of a plurality of circuits may be selectively closed according to the direction of oscillation of said shaft from said mid-position.

11. Apparatus of the character described comprising in combination, a pole-changer for a reversible generator comprising a pivoted contact carrier, means comprising a member driven from the same source of power as the generator and adapted to shift said carrier in one direction or the other according to the direction of rotation of said member, and means for removing said member from contact with said carrier as the speed increases.

12. Apparatus of the character described comprising in combination, a reversible generator, a plurality of external circuits, contact means connected to said circuits, other contact means connected to said generator and adapted to coöperate with said first means, said first means being moved alternately in one direction and then another from an open-circuit position in accordance with the speed of the generator, said second means being shifted to compensate for the reversal of generator polarity attendant upon a reversal of the direction of generator rotation.

13. Apparatus of the character described comprising in combination, a switching device comprising a lever, means for moving said lever two stages from its open circuit position to running position, means for holding said lever in said running position, and means for returning said lever to said open circuit position in a single stage immediately upon the release of said holding means.

14. Apparatus of the character described, comprising in combination, an axle-driven generator, means for connecting said generator to an auxiliary resistance as the generator speed approaches a predetermined value, means for connecting said generator to an external circuit and thereafter breaking the connection to said resistance as said generator attains said predetermined value, and means for disconnecting the generator from both circuits when the train speed is below a lower value, said first means comprising a plurality of contacts movable relatively to a contact surface, insulated contacts on said surface, and a staggered boundary between said surfaces, whereby upon the relative movement of said parts one brush passes over the insulated portion into contact with the second surface before the other brush leaves said first surface.

In testimony whereof, I have signed my name to this specification in the presence of two subscribing witnesses.

HUGO GROB.

Witnesses:
HERMANN HUBER,
JOSEPH SIMON.